US012541122B2

(12) United States Patent
Kowalevicz et al.

(10) Patent No.: US 12,541,122 B2
(45) Date of Patent: Feb. 3, 2026

(54) SYSTEM AND METHOD FOR DIRECTIONALLY-DEPENDENT POLARIZATION MODIFICATION (71) Applicant: Raytheon Company, Waltham, MA (US)

(72) Inventors: Andrew M. Kowalevicz, Arlington, VA (US); Benjamin P. Dolgin, Alexandria, VA (US); Gary M. Graceffo, Burke, VA (US)

(73) Assignee: Raytheon Company, Arlington, VA (US)

( * ) Notice: Subject to any disclaimer, the term of this patent is extended or adjusted under 35 U.S.C. 154(b) by 747 days.

(21) Appl. No.: 17/933,766

(22) Filed: Sep. 20, 2022

(65) Prior Publication Data
US 2023/0087573 A1 Mar. 23, 2023

Related U.S. Application Data (60) Provisional application No. 63/246,648, filed on Sep. 21, 2021, provisional application No. 63/246,676, (Continued)

(51) Int. Cl.
G02F 1/09 (2006.01)
G02B 6/036 (2006.01)
(Continued)

(52) U.S. Cl.
CPC ......... G02F 1/093 (2013.01); G02B 6/03622 (2013.01); G02B 6/2746 (2013.01); G02B 6/2766 (2013.01); G02B 27/283 (2013.01); H04B 10/1125 (2013.01); H04B 10/614 (2013.01); G02F 1/09 (2013.01)

(58) Field of Classification Search
None
See application file for complete search history.

(56) References Cited

U.S. PATENT DOCUMENTS 5,052,786 A    10/1991  Schulz
5,726,801 A     3/1998  Pan
(Continued)

FOREIGN PATENT DOCUMENTS

CN    101089667 A    12/2007
CN    101089667 B     5/2013
(Continued)

OTHER PUBLICATIONS

Non-Final Office Action dated Dec. 29, 2023 in connection with U.S. Appl. No. 17/933,779, 29 pages.
(Continued)

Primary Examiner — Derek S. Chapel (57) ABSTRACT

A system includes an optical transceiver configured to transmit and receive optical signals. The optical transceiver includes a Faraday rotator and a waveplate. The Faraday rotator and the waveplate are collectively configured to provide a relative polarization change between (i) light propagating in a first direction through the Faraday rotator and the waveplate and (ii) light propagating in a second direction opposite the first direction through the Faraday rotator and the waveplate. The waveplate may include a quarter waveplate or a half waveplate.

20 Claims, 9 Drawing Sheets

Related U.S. Application Data filed on Sep. 21, 2021, provisional application No. 63/246,693, filed on Sep. 21, 2021.

(51) Int. Cl.
*G02B 6/27* (2006.01)
*G02B 27/28* (2006.01)
*H04B 10/112* (2013.01)
*H04B 10/61* (2013.01)

(56) References Cited

U.S. PATENT DOCUMENTS

| | | |
|---|---|---|
| 5,729,380 A | 3/1998 | Betin et al. |
| 5,793,789 A | 8/1998 | Ben-Michael et al. |
| 6,249,619 B1 | 6/2001 | Bergmann et al. |
| 6,400,990 B1 | 6/2002 | Silvian |
| 6,476,959 B2 | 11/2002 | Yao |
| 6,545,805 B2 | 4/2003 | He et al. |
| 6,563,982 B1 | 5/2003 | Xie et al. |
| 6,577,900 B1 | 6/2003 | Silvian |
| 6,977,763 B1 | 12/2005 | Wang et al. |
| 7,027,198 B2 | 4/2006 | Yao |
| 7,067,795 B1 | 6/2006 | Yan et al. |
| 7,218,436 B2 | 5/2007 | Yao |
| 7,409,157 B2 | 8/2008 | Arahira |
| 7,436,569 B2 | 10/2008 | Yao et al. |
| 7,440,181 B2 | 10/2008 | Starodoumov et al. |
| 7,466,471 B2 | 12/2008 | Yao |
| 7,508,579 B2 | 3/2009 | Starodoumov et al. |
| 8,571,416 B2 | 10/2013 | Grobe |
| 9,755,739 B1 | 9/2017 | Wang et al. |
| 9,778,020 B2 | 10/2017 | Tumlinson et al. |
| 9,989,700 B1 | 6/2018 | Ayliffe et al. |
| 10,069,562 B2 | 9/2018 | Wang |
| 10,168,501 B2 | 1/2019 | Ashrafi |
| 10,298,325 B1 | 5/2019 | Birnbaum et al. |
| 10,326,526 B2 | 6/2019 | Ashrafi |
| 11,170,318 B2 | 11/2021 | Ashrafi |
| 11,233,573 B2 | 1/2022 | Sandberg |
| 11,595,129 B2* | 2/2023 | Kowalevicz ............ H04B 10/40 |
| 12,271,069 B2* | 4/2025 | Kowalevicz ......... G02B 6/2706 |
| 2001/0024317 A1 | 9/2001 | Yao |
| 2002/0012168 A1* | 1/2002 | Li ...................... H04N 9/3167 |
| | | 359/485.06 |
| 2002/0018618 A1 | 2/2002 | Xie et al. |
| 2002/0076144 A1 | 6/2002 | Tai et al. |
| 2002/0090161 A1 | 7/2002 | Naganuma |
| 2002/0171931 A1 | 11/2002 | McLeod et al. |
| 2002/0171933 A1 | 11/2002 | He et al. |
| 2003/0004412 A1 | 1/2003 | Izatt et al. |
| 2005/0088661 A1 | 4/2005 | Froggatt |
| 2005/0200941 A1 | 9/2005 | Yao |
| 2006/0023987 A1 | 2/2006 | Yao |
| 2006/0045536 A1 | 3/2006 | Arahira |
| 2007/0031151 A1 | 2/2007 | Cunningham et al. |
| 2007/0223078 A1 | 9/2007 | Yao et al. |
| 2007/0291358 A1 | 12/2007 | Colbourne et al. |
| 2008/0030839 A1 | 2/2008 | Yao |
| 2008/0030846 A1 | 2/2008 | Starodoumov et al. |
| 2008/0042050 A1 | 2/2008 | Tanaka et al. |
| 2009/0052016 A1 | 2/2009 | Starodoumov et al. |
| 2011/0277552 A1 | 11/2011 | Chen et al. |
| 2012/0051756 A1 | 3/2012 | Grobe |
| 2015/0295658 A1 | 10/2015 | Chen et al. |
| 2016/0047987 A1 | 2/2016 | Du et al. |
| 2016/0112124 A1 | 4/2016 | Juarez et al. |
| 2016/0341538 A1 | 11/2016 | Tumlinson et al. |
| 2017/0242100 A1 | 8/2017 | Hinokuma et al. |
| 2017/0242206 A1 | 8/2017 | Chen et al. |
| 2017/0343750 A1 | 11/2017 | Ashrafi |
| 2018/0069631 A1 | 3/2018 | Ashrafi |
| 2018/0102843 A1 | 4/2018 | Wang |
| 2018/0284350 A1* | 10/2018 | Ayliffe ................ G02B 6/4246 |
| 2018/0337722 A1 | 11/2018 | Paulsen et al. |
| 2019/0391406 A1 | 12/2019 | Chen |
| 2020/0083659 A1 | 3/2020 | Reeves-Hall et al. |
| 2021/0133614 A1 | 5/2021 | Ashrafi |
| 2021/0297160 A1 | 9/2021 | Sandberg |
| 2023/0090667 A1* | 3/2023 | Kowalevicz ......... G02B 6/4208 |
| | | 398/208 |

FOREIGN PATENT DOCUMENTS

| | | |
|---|---|---|
| CN | 104950407 B | 7/2017 |
| CN | 107390324 A | 11/2017 |
| CN | 109286440 A | 1/2019 |
| CN | 209746185 U | 12/2019 |
| CN | 111504296 A | 8/2020 |
| CN | 111969400 A | 11/2020 |
| EP | 1022590 A1 | 7/2000 |
| EP | 3358385 A1 | 8/2018 |
| EP | 2885886 B1 | 2/2019 |
| GB | 2439213 A | 12/2007 |
| WO | 03009008 A2 | 1/2003 |

OTHER PUBLICATIONS

Beaudette et al., "Advances in Multimodal Imaging Using Double-Clad Fiber Couplers," Journal of Lightwave Technology, vol. 37, No. 22, 2019, 12 pages.

Elmansouri et al., "Compact Wideband Dual-Polarized In-Band Full-Duplex Antenna Subsystem," IEEE Transactions on Antennas and Propagation, vol. 69, No. 11, 2021, 7 pages.

Graceffo et al., "Hybrid RF FSO for Defense and 5G Backhaul," IEEE Globecom Workshops, 2019, 6 pages.

International Search Report and Written Opinion of the International Searching Authority dated Jan. 2, 2023 in connection with International Patent Application No. PCT/US2022/076736, 10 pages.

International Search Report and Written Opinion of the International Searching Authority dated Jan. 9, 2023 in connection with International Patent Application No. PCT/US2022/076954, 10 pages.

International Search Report and Written Opinion of the International Searching Authority dated Jan. 2, 2023 in connection with International Patent Application No. PCT/US2022/076739, 12 pages.

International Search Report and Written Opinion of the International Searching Authority dated Jan. 2, 2023 in connection with International Patent Application No. PCT/US2022/076735, 11 pages.

Non-final Office Action dated Nov. 15, 2024, in connection with U.S. Appl. No. 17/933,785, 13 pages.

Notice of Allowance dated Sep. 20, 2024 in connection with U.S. Appl. No. 17/933,779, 9 pages.

Final Office Action dated Jun. 28, 2024 in connection with U.S. Appl. No. 17/933,779, 24 pages.

"Fiber Optic Circulators", www.fiberoptics4sale.com, 2022, 17 pages.

* cited by examiner

SYSTEM AND METHOD FOR DIRECTIONALLY-DEPENDENT POLARIZATION MODIFICATION

CROSS-REFERENCE TO RELATED APPLICATIONS AND PRIORITY CLAIM

This application claims priority under 35 U.S.C. § 119(e) to U.S. Provisional Patent Application Nos. 63/246,648; 63/246,676; and 63/246,693 all filed on Sep. 21, 2021. These provisional applications are hereby incorporated by reference in their entirety.

This application is related to the following non-provisional patent applications being filed concurrently herewith:
- U.S. patent application Ser. No. 17/933,779, entitled "DUAL-POLARIZATION ROTATIONALLY-INSENSITIVE MONOSTATIC TRANSCEIVER WITH DUAL CLADDING FIBER," now U.S. Pat. No. 12,271,069; and
- U.S. patent application Ser. No. 17/933,785entitled "DUAL-POLARIZATION ROTATIONALLY-INSENSITIVE MONOSTATIC TRANSCEIVER WITH STANDARD FIBER," now U.S. Pat. No. 12,411,369.

These non-provisional applications are hereby incorporated by reference in their entirety.

TECHNICAL FIELD

This disclosure is generally directed to optical systems. More specifically, this disclosure is directed to a system and method for directionally-dependent polarization modification.

BACKGROUND

Optical communication systems use light to transport data between locations. Next-generation optical transceivers are being designed for use in free-space optical systems, which refer to systems where optical signals are transmitted and received through free space rather than through optical fibers. Some optical communication systems use polarized light to support the transport of data between locations. Various optical elements can be used to alter or control the polarization of light, such as a Faraday rotator. A Faraday rotator rotates the polarization of incoming light by the same magnitude and direction independent of the light's direction of incidence on the Faraday rotator.

SUMMARY

This disclosure is directed to a system and method for directionally-dependent polarization modification.

In a first embodiment, an apparatus includes a Faraday rotator and a waveplate. The Faraday rotator and the waveplate are collectively configured to provide a relative polarization change between (i) light propagating in a first direction through the Faraday rotator and the waveplate and (ii) light propagating in a second direction opposite the first direction through the Faraday rotator and the waveplate.

In a second embodiment, a system includes an optical transceiver configured to transmit and receive optical signals. The optical transceiver includes a Faraday rotator and a waveplate. The Faraday rotator and the waveplate are collectively configured to provide a relative polarization change between (i) light propagating in a first direction through the Faraday rotator and the waveplate and (ii) light propagating in a second direction opposite the first direction through the Faraday rotator and the waveplate.

In a third embodiment, a method includes propagating light in first and second directions through a Faraday rotator and a waveplate. The method also includes using the Faraday rotator and the waveplate to provide a relative polarization change between (i) the light propagating in the first direction through the Faraday rotator and the waveplate and (ii) the light propagating in the second direction opposite the first direction through the Faraday rotator and the waveplate.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, optical communication systems use light to transport data between locations. Next-generation optical transceivers are being designed for use in free-space optical systems, which refer to systems where optical signals are transmitted and received through free space rather than through optical fibers. Some optical communication systems use polarized light to support the transport of data between locations. Various optical elements can be used to alter or control the polarization of light, such as a Faraday rotator. A Faraday rotator rotates the polarization of incoming light by the same magnitude and direction independent of the light's direction of incidence on the Faraday rotator.

Some optical elements are generally characterized as being reciprocal, meaning that the response of light to that element is symmetrical when source and observation locations are interchanged. Other optical elements are non-reciprocal, where that symmetry is broken. One example of a non-reciprocal optical element is a Faraday rotator, which rotates the incoming polarization of light by the same magnitude and direction regardless of the direction of incidence of the light on the Faraday rotator. In some cases, non-reciprocal optical elements can be realized by a number of techniques, such as by using non-linear materials, magnetic fields, microfabrication techniques, and the like.

This disclosure provides various approaches for providing directionally-dependent polarization modifications to light, such as by providing different polarization rotation amounts or different polarization transformation effects that are dependent on the direction of propagation of light through two or more optical elements. In some embodiments, passive optical approaches are supported to allow light propagating in one direction to be unaltered while providing a polarization modification to light propagating in the opposite direction. In other embodiments, passive optical approaches are supported to allow light propagating in one direction to experience a first polarization modification while providing a second polarization modification to light propagating in the opposite direction.

These approaches are achieved using a Faraday rotator and a waveplate. In some cases, the waveplate may represent a half waveplate. In these cases, for instance, light propagating in one direction through the Faraday rotator and the waveplate may be unaltered, and a polarization rotation can be created in light propagating in the opposite direction through the Faraday rotator and the waveplate. The amount of polarization rotation can be controlled based on the angle of the half waveplate's rotation and/or the thickness of the Faraday rotator.

In other cases, the waveplate may represent a quarter waveplate. In those cases, for instance, light propagating in one direction through the Faraday rotator and the waveplate may be unaltered or may undergo a polarization rotation, and, for quarter waveplates, a polarization state modification (such as a change from linear polarization to circular/elliptical polarization or vice versa) can be created in light propagating in the opposite direction through the Faraday rotator and the waveplate.

Moreover, this disclosure provides multiple possible configurations of optical transceivers that allow for new architectures in optical communication, imaging, sensing, or other systems. In these systems, optical beams can be combined and separated in different ways than previously contemplated. Some embodiments of this disclosure provide beam polarization that can be controlled independently of propagation direction in the optical transceivers. Also, some embodiments of this disclosure provide a transformation from linear- to circularly-polarized light, which can be achieved with directional dependence.

Figure 1:
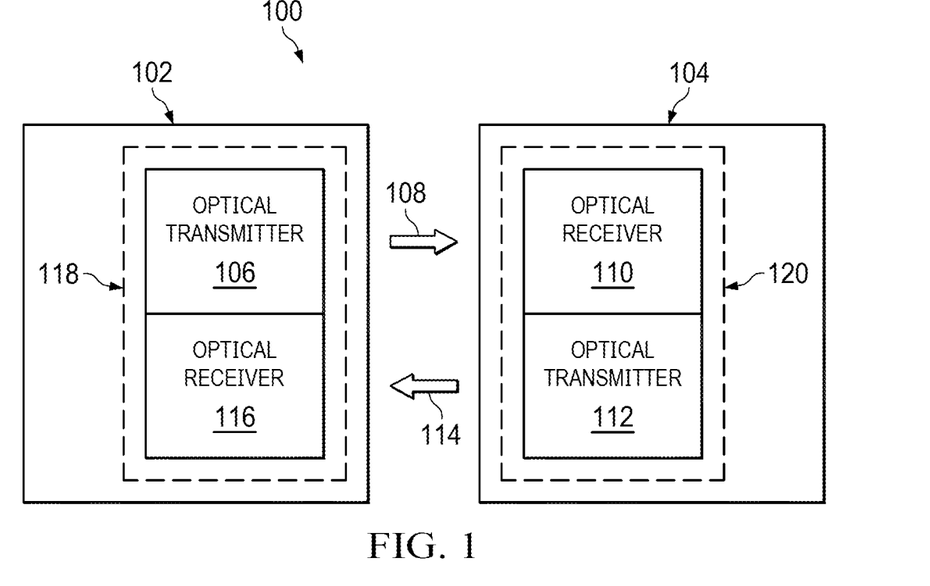
FIG. 1 illustrates an example free-space optical system according to this disclosure.

FIG. 1 illustrates an example free-space optical (FSO) system 100 according to this disclosure. As shown in FIG. 1, the system 100 includes two nodes 102 and 104 that communicate with one another optically. Each node 102 and 104 represents a ground-, air-, or space-based system that can transmit or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same structure to be used for both transmission and reception purposes. Similarly, while the optical transmitter 112 and the optical receiver 110 are shown here as separate components, they can be integrated into a single optical transceiver 120. This may allow, for instance, the same structure to be used for both transmission and reception purposes.

The optical transmitters, receivers, and transceivers described in this disclosure may find use in a large number of applications, such as communications, imaging, and remote sensing applications. For example, optical transmitters, receivers, or transceivers may be used in data centers or telecommunication systems to transport information rapidly between locations, including the transport of large amounts of information over very large distances. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing. In general, this disclosure is not limited to any particular application of the optical transmitters, receivers, and transceivers.

Although FIG. 1 illustrates one example of a free-space optical system 100, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

FIGS. 2A through 2D illustrate example directionally-dependent optical modification devices 200 and 210 and related details according to this disclosure. The directionally-dependent optical modification devices 200 and 210 may, for example, represent or be used within the optical nodes 102 and 104 of the system 100 of FIG. 1, such as when the directionally-dependent optical modification devices 200 and 210 are used as the optical transmitters, receivers, or transceivers in FIG. 1. However, the directionally-dependent optical modification devices 200 may be used in any other suitable device(s) and in any other suitable system(s).

Figure 2A:
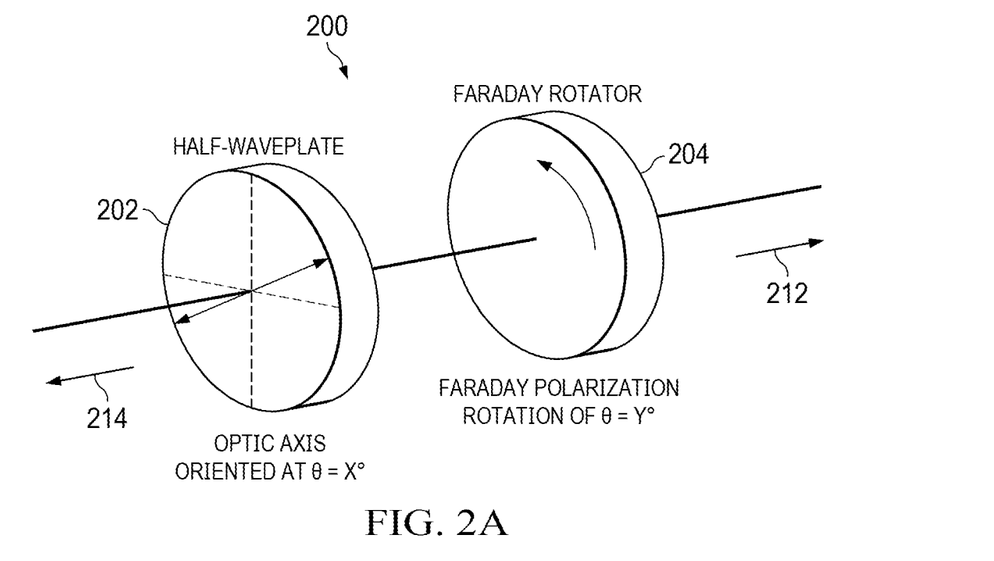
FIGS. 2A through 2D illustrate example directionally-dependent optical modification devices and related details according to this disclosure.

As shown in FIG. 2A, the directionally-dependent optical modification device 200 includes a half waveplate 202 and a Faraday rotator 204. In this example, the half waveplate 202 and the Faraday rotator 204 allow light propagating in a first direction 212 to be substantially unaltered while providing a polarization rotation to light propagating in a second direction 214 opposite the first direction 212. The amount of polarization rotation can be controlled based on an angle of rotation of the half waveplate 202, a thickness of the Faraday rotator 204, or both. In some cases, the half waveplate 202 can be rotated freely relative to the Faraday rotator 204 in order to obtain a desired rotation. Also or alternatively, in some cases, the thickness of the Faraday rotator 204 can be selected in order to obtain a polarization rotation of between 0° to 360°.

Figure 2B:
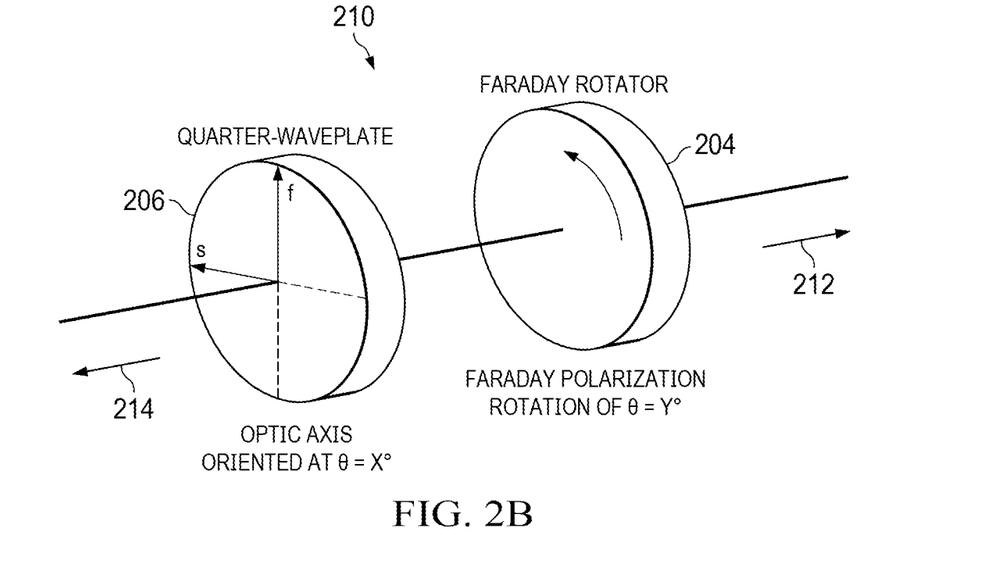
Figure 2C:
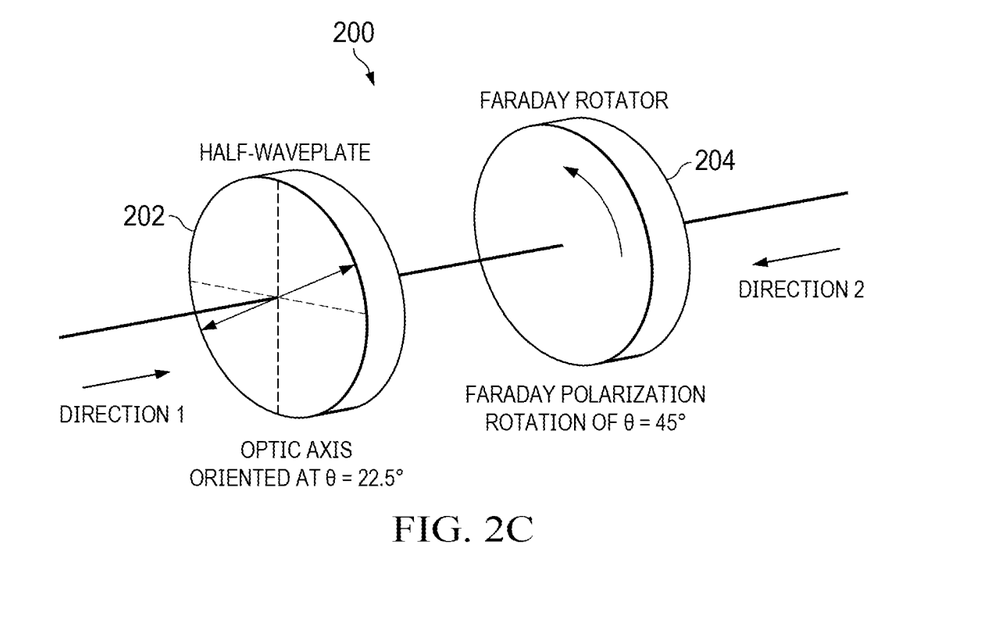

As shown in FIG. 2B, the directionally-dependent optical modification device 210 includes a quarter waveplate 206 and the Faraday rotator 204. In this example, the quarter waveplate 206 and the Faraday rotator 204 allow light propagating in the first direction 212 to be substantially unaltered or to undergo a polarization rotation while providing a polarization state modification to light propagating in the second direction 214 opposite the first direction 212. The polarization state modification may include a change from linear polarization to circular or elliptical polarization or vice versa. As a particular example, linearly-polarized light may remain linearly-polarized when traveling along the first direction 212, but linearly-polarized light may be transformed into circularly-polarized light or elliptically-polarized light when traveling along the second direction 214. In some cases, the quarter waveplate 206 can be rotated freely relative to the Faraday rotator 204 in order to obtain a desired state modification to light traveling in one or both directions 212, 214. The directionally-dependent optical modification devices 200, 210 are configured to cause a change in a polarization state including a change in orientation from linear to circular or elliptical or a change in linear angle.

Figure 2D:
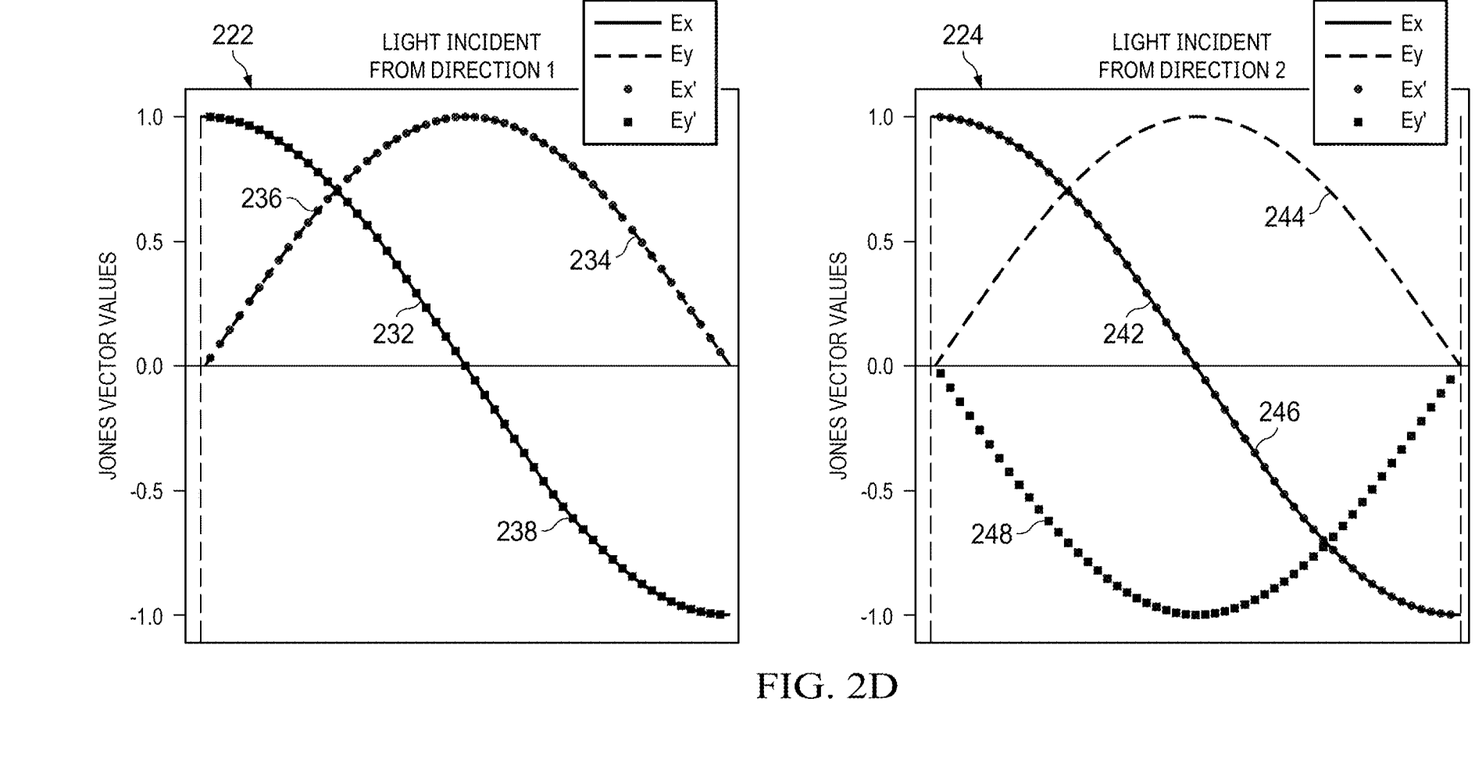

Specific characteristics of components in the directionally-dependent optical modification devices 200, 210 (such as the thickness of the Faraday rotator 204, the type of waveplate 202 or 206 used, and the orientation/angle of the waveplate 202 or 206 relative to the Faraday rotator 204) enable a number of different implementations to be generated and utilized. In the example shown in FIG. 2C, for instance, the Faraday rotator 204 provides a polarization rotation of about 45°, and the half waveplate 202 is oriented at a rotation angle of about 22.5° with respect to the positive x-axis. This results in operational characteristics as shown in FIG. 2D, where two plots 222 and 224 identify initial and final polarization states for linearly-polarized light traveling along the two propagation directions 212 and 214. As shown in FIG. 2D, the first plot 222 shows that the $E_x$ elements 232 and $E_y$ elements 234 of a Jones matrix prior to polarization modification are respectively exchanged for $E_x'$ elements 236 and $E_y'$ elements 238 after polarization modification for every linear polarization state incident from the first direction 212. As a result, the polarization rotation of the light traveling in the first direction 212 may remain substantially unchanged. The second plot 224 shows that the $E_x$ elements 242 match the $E_x'$ elements 246, but the $E_y'$ elements 248 switch sign as compared to the $E_y$ elements 244. This indicates that the directionally-dependent optical modification device 200 is providing a polarization rotation to the light traveling in the second direction 214.

Although FIGS. 2A through 2D illustrate examples of directionally-dependent optical modification devices 200, 210 and related details, various changes may be made to FIGS. 2A through 2D. For example, each directionally-dependent optical modification device 200, 210 may represent elements in any suitable optical-based communication system or other optical system. Also, the directionally-dependent optical modification devices 200, 210 are shown in simplified form here and may include any number of additional components in any suitable configuration as needed or desired. Although a Faraday rotator 204, half waveplate 202, or quarter waveplate 206 are depicted, the directionally-dependent optical modification device can include any number of elements having a respective thickness dimensioned to produce a desired optical rotational state change.

FIGS. 3A through 3D illustrate example rotational modifications by non-reciprocal optical devices according to this disclosure. In the examples shown in FIGS. 3A and 3B, the half waveplate 202 and the Faraday rotator 204 of the directionally-dependent optical modification device 200 are used. Here, the half waveplate 202 has an optical axis oriented at about 22.5°, and the Faraday rotator 204 is configured to provide a polarization rotation of about 45° (which is the same arrangement shown in FIG. 2C).

Figure 3A:
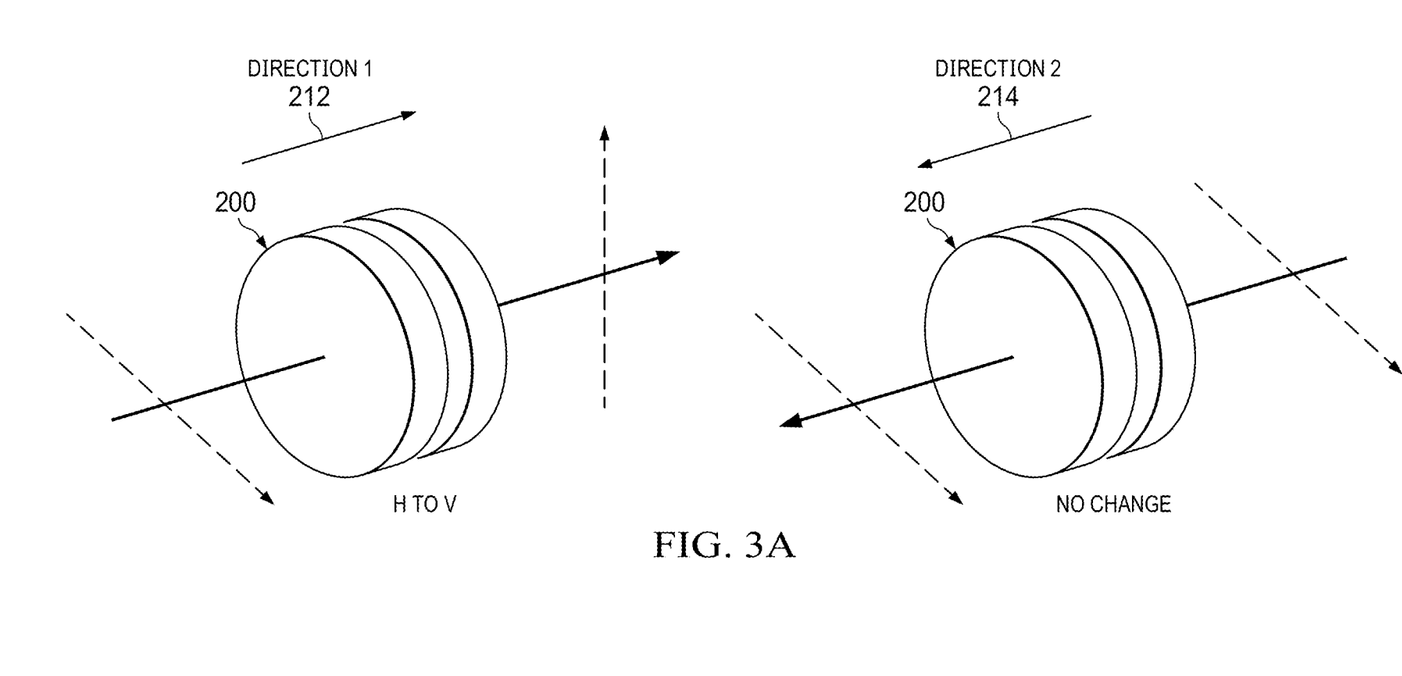
FIGS. 3A through 3D illustrate example rotational modifications by non-reciprocal optical devices according to this disclosure.
Figure 3B:
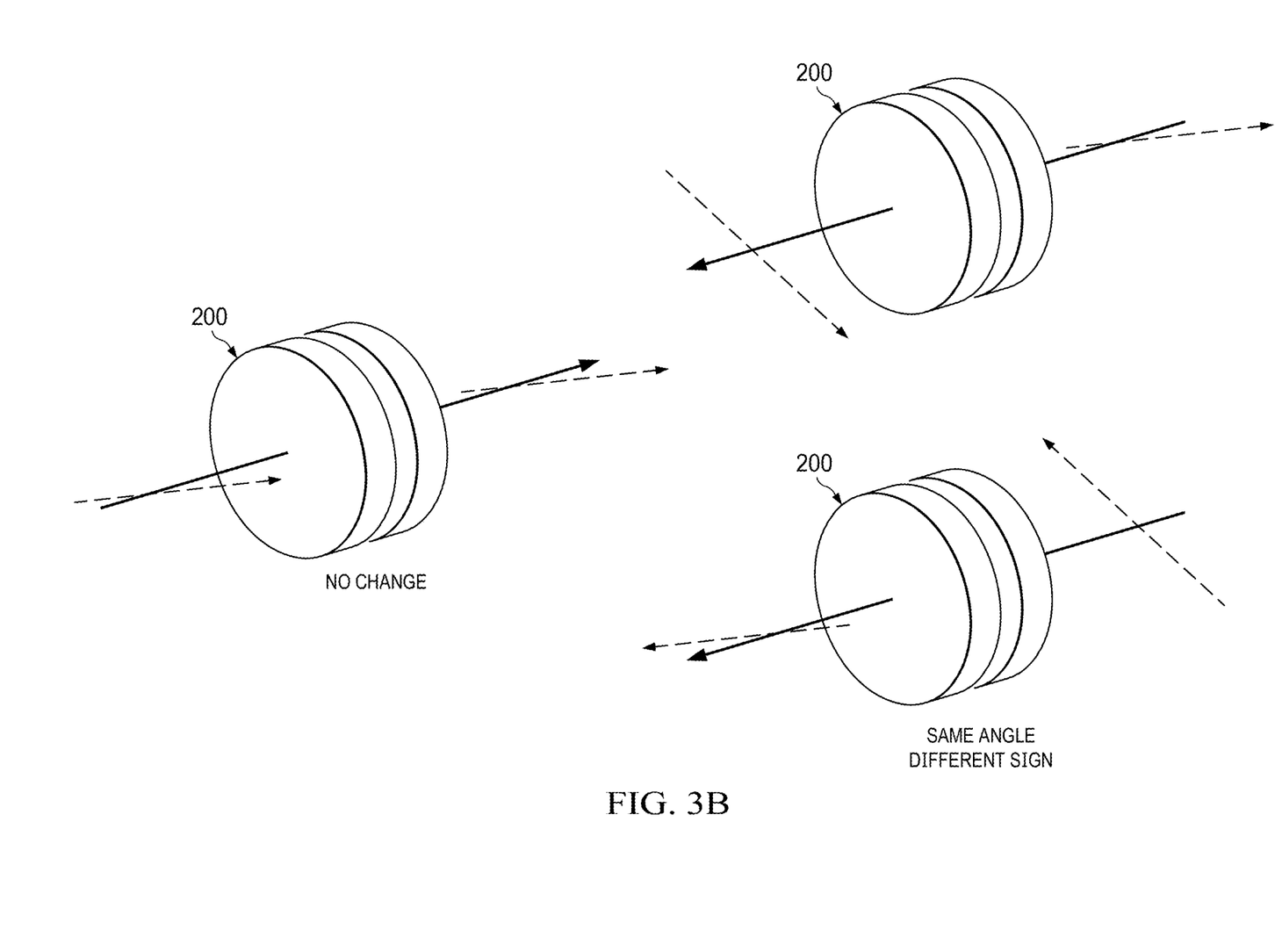

In the example depicted in FIG. 3A, as light propagates in the first direction 212, the directionally-dependent optical modification device 200 changes the light from a horizontal (H) orientation (which has a linear polarization) to a vertical (V) orientation (which has the linear polarization). However, light propagating in the second direction 214 remains substantially unchanged in orientation. In the example depicted in FIG. 3B, as light propagates in the first direction 212, the light remains substantially unchanged in orientation. However, light propagating in the second direction 214 is modified by the directionally-dependent optical modification device 200 to have the same angular orientation but a different sign. That is, the input polarization is +45° from the first direction that leads to no polarization change. For the other direction, the input polarization at 135° rotates 90° to 225° at the output, and an input polarization of 45° rotates by −90° to −45° at the output that is the 'same angle different sign' rotation In the examples shown in FIGS. 3C and 3D, the quarter waveplate 206 and the Faraday rotator 204 of the directionally-dependent optical modification device 210 are used. Here, the quarter waveplate 206 includes a fast axis that is oriented vertically, and the Faraday rotator 204 is configured to provide a polarization rotation of about 45°.

Figure 3C:
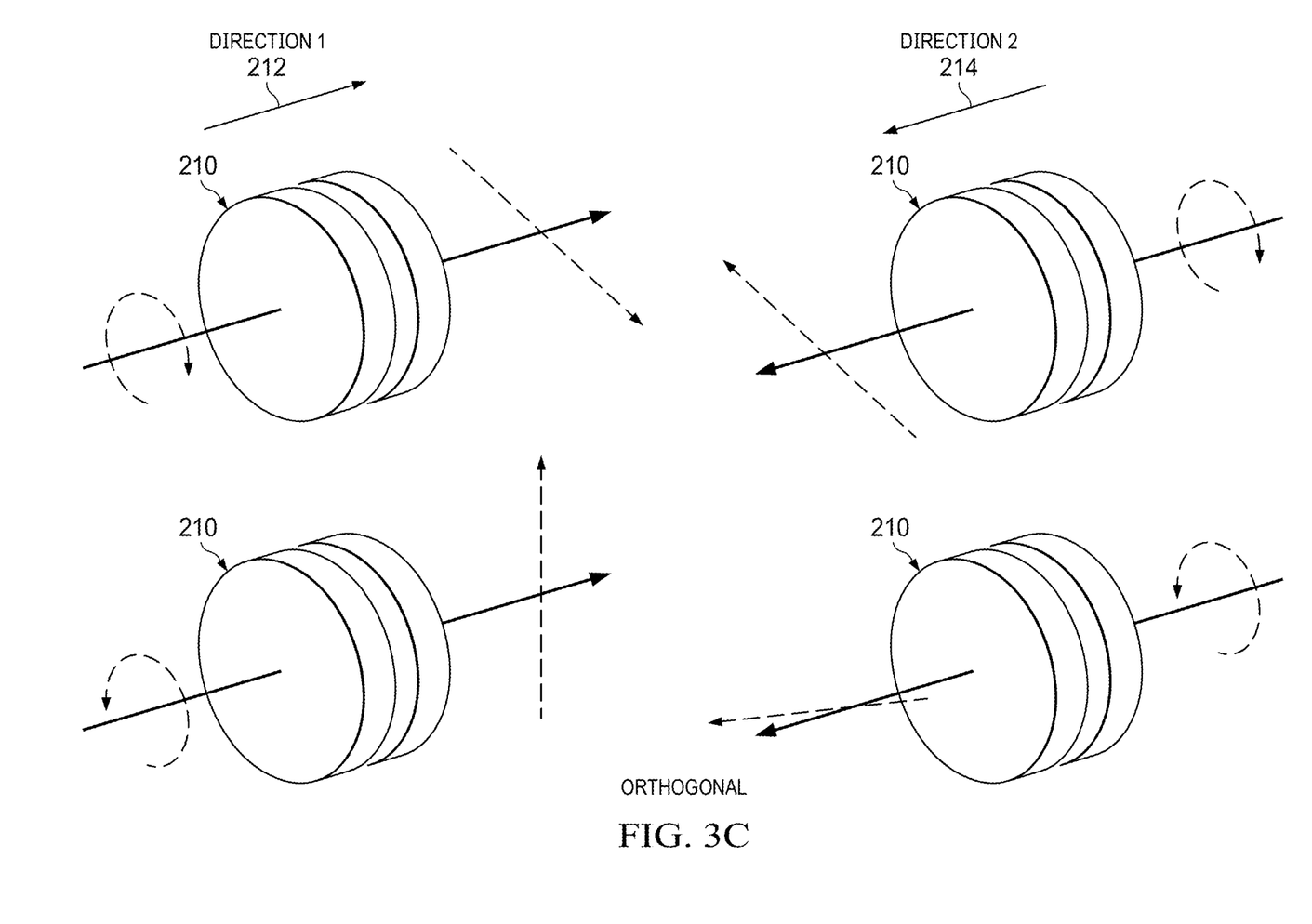
Figure 3D:
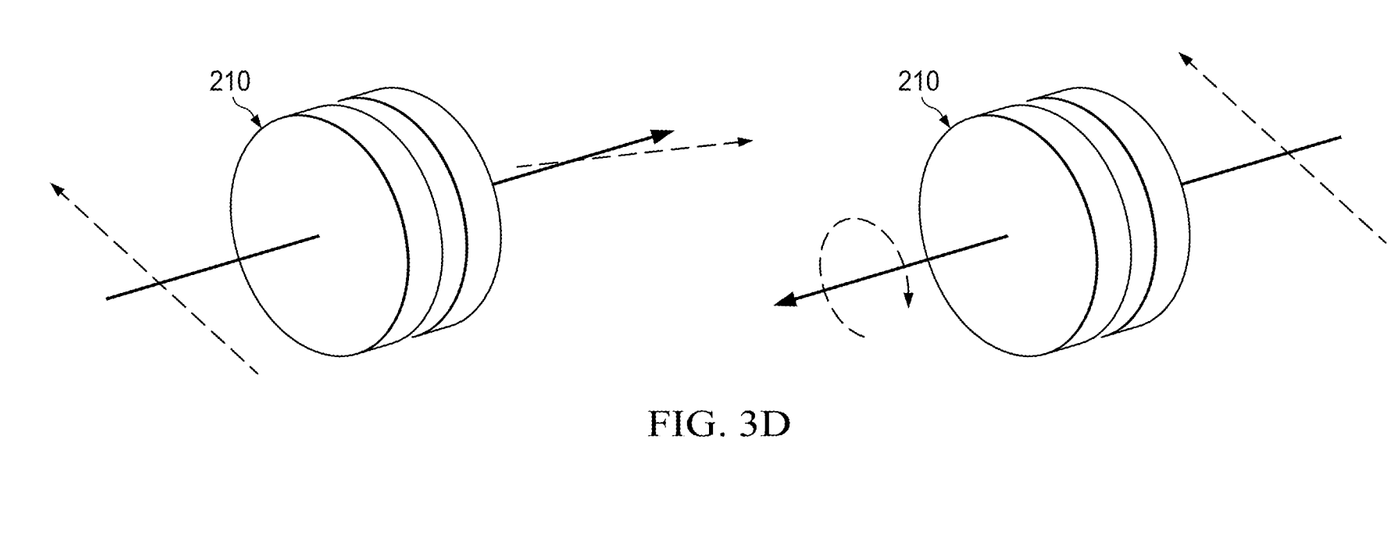

In the example depicted in FIG. 3C, as light propagates in the first direction 212, the directionally-dependent optical modification device 210 changes the light from a circular/elliptical polarization to a linear polarization. Depending upon whether the circular/elliptical polarization has a right-hand (RH) polarization or a left-hand (LH) polarization, the resultant linear polarization will be orthogonal, meaning the output for light having the LH polarization is orthogonal to the output for light having the RH polarization. As a particular example, light having a RH polarization may be converted into light having a horizontal orientation, while light having a LH polarization may be converted into light having a vertical orientation. As light propagates in the second direction 214, the directionally-dependent optical modification device 210 changes the light from a circular/elliptical polarization to a linear polarization. Again, depending upon whether the circular/elliptical polarization has a RH polarization or a LH polarization, the resultant linear orientation will be orthogonal, meaning the output for light having the LH polarization is orthogonal to the output for light having the RH polarization. In the example depicted in FIG. 3D, as light propagates in the first direction 212, the directionally-dependent optical modification device 200 may maintain the linear polarization of the light but rotate the linear polarization. As light propagates in the second direction 214, the directionally-dependent optical modification device 200 changes the beam from a linear polarization to a circular/elliptical polarization.

Although FIGS. 3A through 3D illustrate examples of rotational modifications by directionally-dependent optical modification devices 200, 210, various changes may be made to FIGS. 3A through 3D. For example, the directionally-dependent optical modification devices 200, 210 may include in any suitable waveplates and Faraday rotators in any suitable configurations and are not limited to the specific arrangement shown in FIGS. 3A through 3D.

Figure 4:
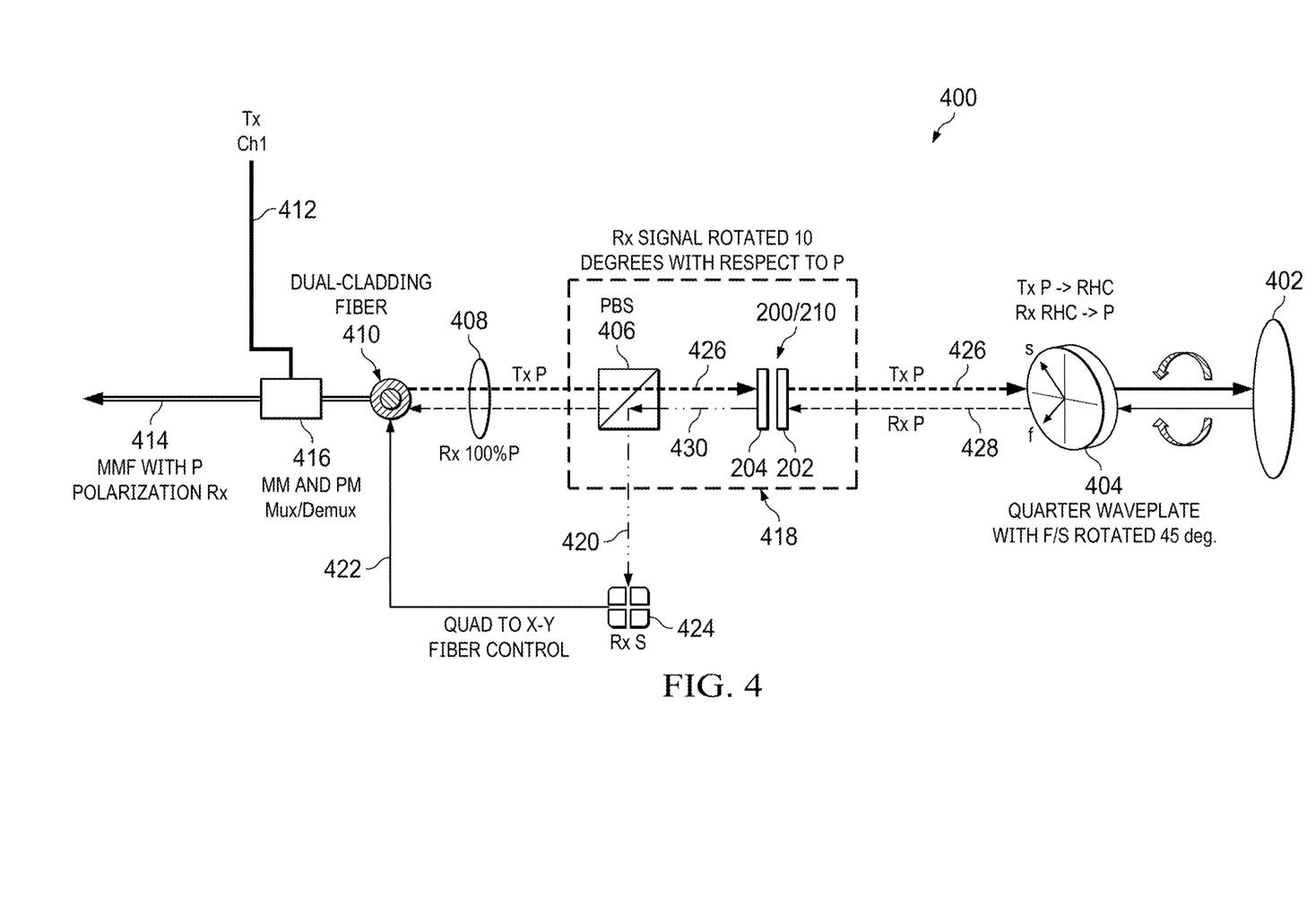
FIG. 4 illustrates an example optical transceiver according to this disclosure.

FIG. 4 illustrates an example optical transceiver 400 according to this disclosure. The optical transceiver 400 may, for example, represent or be used within the optical nodes 102 and 104 of the system 100 of FIG. 1. However, the optical transceiver 400 may be used in any other suitable device(s) and in any other suitable system(s).

As shown in FIG. 4, the optical transceiver 400 includes a collection telescope 402, a quarter waveplate 404, the directionally-dependent optical modification device 200 or 210, a polarization beam splitter (PBS) 406, and a lens 408. The optical transceiver 400 is coupled to a dual cladding fiber (DCF) 410 that is configured to transport outgoing signals on a single mode fiber (SMF) 412 and incoming signals on a multi-mode (MM) fiber 414. A multiplexer/demultiplexer (Mux/Demux) 416 is configured to respectively combine and separate the incoming and outgoing signals on a channel for the optical transceiver 400. The collection telescope 402 is configured to receive incoming light and direct or focus outgoing light. The quarter waveplate 404 is configured to alter a rotational polarization of light from a linear rotation to a circular rotation (for outgoing light) and vice versa (for incoming light). The directionally-dependent optical modification device 200 or 210 and PBS 406 collectively form an optical modification device (OMD) 418. The OMD 418 is configured to maintain or modify light differently according to a direction of travel through the OMD 418. The OMD 418 can also extract a sampled signal 420 of the light, such as for use in generating a control signal 422 that allows for adjustments to the position of the DCF 410.

In the example shown in FIG. 4, the OMD 418 is configured to maintain an angular rotation of a transmit (Tx) beam 426 while modifying an angular rotation of a receive (Rx) beam 428. In some cases, both the transmit beam 426 and the receive beam 428 may have a P polarization. The transmit beam 426 traverses through the PBS 406 and is substantially unattenuated by the PBS 406. Assuming the OMD 418 uses the directionally-dependent optical modification device 200, the Faraday rotator 204 may have a thickness that provides a 5° rotation and the subsequent half waveplate 202 may have its fast-axis oriented at about 2.5° from the x-axis in order to provide a −5° rotation. Therefore, the transmit beam 426 is rotated 5° by the Faraday rotator 204, and the transmit beam 426 is rotated −5° by the half waveplate 202 in the opposite direction. As a result, the OMD 418 provides substantially no rotational adjustment to the transmit beam 426. Conversely, the receive beam 428 may be rotated −5° by the half waveplate 202 and then additionally rotated −5° by the Faraday rotator 204 to provide a −10° rotational adjustment to the receive beam 428, creating a changed receive signal 430. Thus, in one propagation direction, the OMD 418 is configured to apply a difference between the angles of the half waveplate 202 and the Faraday rotator 204. In the opposite propagation direction, the OMD 418 is configured to apply a sum of the angles of the half waveplate 202 and the Faraday rotator 204.

In some embodiments, the PBS 406 is configured to extract an S component of the receive signal 430 as the sampled signal 420. In some cases, the PBS 406 can extract the S component from a signal by reflecting the S polarized component while allowing the P polarized component to proceed unattenuated. As noted above, the sampled signal 420 can be used as a control signal 422 by the position sensitive detector 424 or other feedback mechanism.

Although FIG. 4 illustrate one example of an optical transceiver 400, various changes may be made to FIG. 4. For example, the optical transceiver 400 may include any suitable number of optical devices or different types of optical devices. Also, although the optical transceiver 400 is described as using the directionally-dependent optical modification device 200, the optical transceiver 400 may use the directionally-dependent optical modification device 210. Further, the specific angles of rotation mentioned above are for illustration only. In addition, any other suitable components may be used with the optical transceiver 400 to support any other desired functions of the optical transceiver 400.

Figure 5:
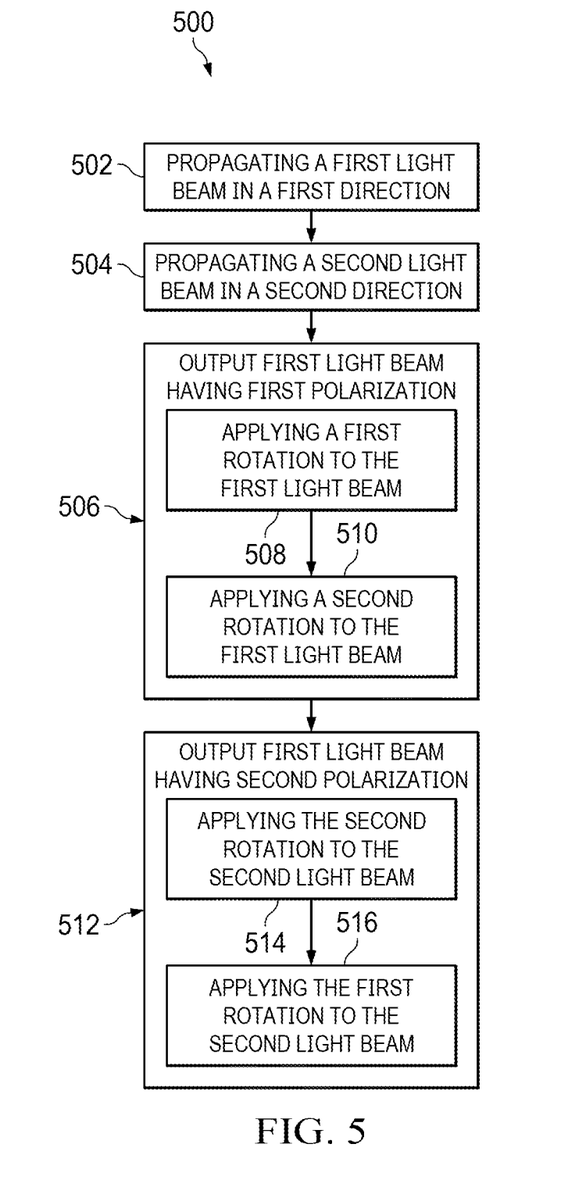
FIG. 5 illustrates an example method for directionally-dependent modification of a polarization of an optical signal according to this disclosure.

FIG. 5 illustrates an example method 500 for directionally-dependent modification of a polarization of an optical signal according to this disclosure. For ease of explanation, the method 500 is described with respect to the directionally-dependent optical modification devices 200, 210, which may be used in the optical nodes 102, 104 in the system 100 of FIG. 1. However, the method 500 could be used with any other suitable non-reciprocal optical device(s) in any other suitable device(s) or any other suitable system(s).

In step 502, a first light beam is propagated in a first direction. In step 504, a second light beam is propagated in a second direction. Each of the first and second light beams can be generated with a first polarization (such as a P polarization). The first light beam is provided to (and possibly modified by) a non-reciprocal optical device at step 506. The non-reciprocal optical device causes the first light beam to have a first polarization by applying a first rotation by a first rotational element at step 508 and applying a second rotation by a second rotational element at step 510. The rotational elements can represent the Faraday rotator 204 and the half waveplate 202 or the quarter waveplate 206. The second light beam is provided to (and possibly modified by) the non-reciprocal optical device at step 512. The non-reciprocal optical device causes the second light beam to have a second polarization by applying the second rotation by the second rotational element at step 514 and applying the first rotation by the first rotational element at step 516.

Although FIG. 5 illustrates one example of a method 500 for directionally-dependent modification of a polarization of an optical signal, various changes may be made to FIG. 5. For example, while shown as a series of steps, various steps in FIG. 5 could overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a Faraday rotator; and
   a waveplate;
   wherein the Faraday rotator and the waveplate are collectively configured to provide a relative polarization change between (i) light propagating in a first direction through the Faraday rotator and the waveplate and (ii) light propagating in a second direction opposite the first direction through the Faraday rotator and the waveplate; and
   wherein the Faraday rotator and the waveplate are collectively configured to cause the light propagating in the second direction to have a polarization rotation at a same angle but a different sign compared to a polarization rotation of the light propagating in the first direction.

2. The apparatus of claim 1, wherein the Faraday rotator and the waveplate are collectively configured to cause (i) the light propagating in the first direction to have a first polarization state and (ii) the light propagating in the second direction to have a second polarization state different than the first polarization state.

3. The apparatus of claim 1, wherein the Faraday rotator and the waveplate are collectively configured to cause (i) the light propagating in the first direction to have no polarization rotation and (ii) the light propagating in the second direction to have a non-zero polarization rotation.

4. The apparatus of claim 1, wherein:
   the Faraday rotator provides a polarization rotation of about 45°; and
   the waveplate has an optical axis oriented at about 22.5.

5. The apparatus of claim 1, wherein the Faraday rotator and the waveplate are collectively configured to change the light propagating in the first direction from a first linear rotation to a second linear rotation different than the first linear rotation.

6. The apparatus of claim 1, wherein the Faraday rotator and the waveplate are collectively configured to change the light propagating in the second direction from a first circular/elliptical rotation to a second circular/elliptical rotation different than the first circular/elliptical rotation.

7. The apparatus of claim 1, wherein the waveplate comprises a half waveplate.

8. The apparatus of claim 1, further comprising:
   a polarization beam splitter configured to separate a portion of a light output from the Faraday rotator and the waveplate.

9. A system comprising:
   an optical transceiver configured to transmit and receive optical signals, wherein the optical transceiver comprises:
   a Faraday rotator; and
   a waveplate;
   wherein the Faraday rotator and the waveplate are collectively configured to provide a relative polarization change between (i) light propagating in a first direction through the Faraday rotator and the waveplate and (ii) light propagating in a second direction opposite the first direction through the Faraday rotator and the waveplate; and
   wherein the Faraday rotator and the waveplate are collectively configured to cause the light propagating in the second direction to have a polarization rotation at a same angle but a different sign compared to a polarization rotation of the light propagating in the first direction.

10. The system of claim 9, wherein the Faraday rotator and the waveplate are collectively configured to cause (i) the light propagating in the first direction to have a first polarization state and (ii) the light propagating in the second direction to have a second polarization state different than the first polarization state.

11. The system of claim 9, wherein the Faraday rotator and the waveplate are collectively configured to cause (i) the light propagating in the first direction to have no polarization change and (ii) the light propagating in the second direction to have a non-zero polarization change.

12. The system of claim 9, wherein the waveplate comprises a half waveplate.

13. The system of claim 9, wherein the Faraday rotator and the waveplate are collectively configured to change the light propagating in the first direction from a first linear rotation to a second linear rotation different than the first linear rotation.

14. The system of claim 9, wherein the Faraday rotator and the waveplate are collectively configured to change the light propagating in the second direction from a first circular/elliptical rotation to a second circular/elliptical rotation different than the first circular/elliptical rotation.

15. A method comprising:
   propagating light in first and second directions through a Faraday rotator and a waveplate; and
   using the Faraday rotator and the waveplate to provide a relative polarization change between (i) the light propagating in the first direction through the Faraday rotator and the waveplate and (ii) the light propagating in the second direction opposite the first direction through the Faraday rotator and the waveplate;

wherein the Faraday rotator and the waveplate cause the light propagating in the second direction to have a polarization rotation at a same angle but a different sign compared to a polarization rotation of the light propagating in the first direction.

16. The method of claim 15, wherein the Faraday rotator and the waveplate cause (i) the light propagating in the first direction to have a first polarization state and (ii) the light propagating in the second direction to have a second polarization state different than the first polarization state.

17. The method of claim 15, wherein the Faraday rotator and the waveplate cause (i) the light propagating in the first direction to have no polarization rotation and (ii) the light propagating in the second direction to have a non-zero polarization rotation.

18. The method of claim 15, wherein the waveplate comprises a half waveplate.

19. The method of claim 15, wherein the Faraday rotator and the waveplate change the light propagating in the first direction from a first linear rotation to a second linear rotation different than the first linear rotation.

20. The method of claim 15, wherein the Faraday rotator and the waveplate change the light propagating in the second direction from a first circular/elliptical rotation to a second circular/elliptical rotation different than the first circular/elliptical rotation.

\* \* \* \* \*